United States Patent
Xia

(10) Patent No.: US 9,438,917 B2
(45) Date of Patent: Sep. 6, 2016

(54) SYSTEM AND METHOD FOR ADAPTIVE BANDWIDTH MANAGEMENT

(71) Applicant: FutureWei Technologies, Inc., Plano, TX (US)

(72) Inventor: Guangsong Xia, Fremont, CA (US)

(73) Assignee: Futurewei Technologies, Inc., Plano, TX (US)

(*) Notice: Subject to any disclaimer, the term of this patent is extended or adjusted under 35 U.S.C. 154(b) by 325 days.

(21) Appl. No.: 13/865,769

(22) Filed: Apr. 18, 2013

(65) Prior Publication Data

US 2014/0314139 A1   Oct. 23, 2014

(51) Int. Cl.
*H04N 19/17* (2014.01)
*H04N 19/169* (2014.01)
*H04N 19/10* (2014.01)
*H04N 19/15* (2014.01)
*H04N 19/00* (2014.01)
*H04N 19/115* (2014.01)
*H04N 19/136* (2014.01)

(52) U.S. Cl.
CPC .............. *H04N 19/15* (2014.11); *H04N 19/00* (2013.01); *H04N 19/10* (2014.11); *H04N 19/115* (2014.11); *H04N 19/136* (2014.11); *H04N 19/169* (2014.11); *H04N 19/17* (2014.11)

(58) Field of Classification Search
None
See application file for complete search history.

(56) References Cited

U.S. PATENT DOCUMENTS

| | | | | |
|---|---|---|---|---|
| 5,784,572 | A  * | 7/1998 | Rostoker et al. | ............. 709/247 |
| 8,392,596 | B2 * | 3/2013 | Kamay | ......................... 709/231 |
| 8,724,696 | B2 * | 5/2014 | Byford et al. | ............ 375/240.01 |
| 2005/0052427 | A1 * | 3/2005 | Wu et al. | ....................... 345/173 |
| 2013/0195421 | A1 * | 8/2013 | Chen | .................... G11B 27/034 386/239 |

* cited by examiner

*Primary Examiner* — Joni Richer
(74) *Attorney, Agent, or Firm* — Slater Matsil, LLP

(57) ABSTRACT

System and method embodiments are provided for adaptive bandwidth management for transporting rendered graphics in a virtual desktop infrastructure. The embodiments include a video detection algorithm that enables a driver for a graphics processor at the server's end to identify displayed video data at the user's end. The driver identifies video traffic that is sent to the user device by tracking repeated bitmap operations at the same display area or block of an application displayed window at the user device. When the number of bitmap operations reaches a pre-determined threshold, then the corresponding area is considered a video display area. When detecting that a bandwidth threshold for transporting graphics data from the server to the device is reached, the data corresponding to the detected video area is compressed using a higher compression rate, thus increasing the loss rate of transferred video data to improve playback experience for the user.

18 Claims, 2 Drawing Sheets

SYSTEM AND METHOD FOR ADAPTIVE BANDWIDTH MANAGEMENT

TECHNICAL FIELD

The present invention relates to network communications and optimization, and, in particular embodiments, to a system and method for adaptive bandwidth management.

BACKGROUND

A virtual desktop infrastructure (VDI) is an infrastructure that allows a user or client device to access, via a network, a virtual machine at a remote server to process and display graphics (e.g., video graphics). The graphics are processed at the VM or remote server and then displayed remotely at the user device. For example, the user device communicates with the VM at the remote server using a Transmission Control Protocol (TCP) to display video via a web browser application. When there is no bandwidth restriction, the display quality can match or be similar to that of locally processed and displayed graphics at the device. However, traffic is often transferred in bursts and network bandwidth is limited. Further, when videos for a substantial number of users are server rendered, the overall traffic bandwidth in the network increases. When a threshold bandwidth for traffic is reached, the displayed video becomes unacceptably slow to the user. Therefore, there is a need for an improved graphics/video transfer scheme in a VDI that is adaptive to bandwidth conditions between the user and the server, e.g., to avoid unacceptable slow video display speed that affects user experience.

SUMMARY OF THE INVENTION

In accordance with an embodiment, in a server, a method for adaptive bandwidth management to handle graphics for a virtual desktop infrastructure (VDI) includes determining, at the server, whether graphics data transmitted to a remote user device has reached a threshold bandwidth, upon determining that the graphics data has reached the threshold bandwidth, detecting whether there is video data among the graphics data and upon detecting video data among the graphics data, compressing video data at a higher compression rate than the graphics data before transmitting the video data with the graphics data to the remote user device.

In accordance with another embodiment, in a virtual machine (VM) at a server, a method for adaptive bandwidth management to handle graphics for a VDI includes tracking, at a driver for graphics rendering at the VM, a number of bitmap operations for each window display area of an application that displays graphics data on a remote user device, and upon detecting that the number of bitmap operations of a window display area has reached a pre-determined maximum number of hits, identifying the graphics data for the window display area as video data. The method further includes tracking a bandwidth of the graphics data, upon detecting that the bandwidth has reached a threshold, increasing a compressing rate of the video data to a pre-determined rate, and sending the graphics data including the video data compressed at the pre-determined rate to the remote user device.

In accordance with yet another embodiment, a network component configured for adaptive bandwidth management for graphics rendering includes a VM, a processor, and a computer readable storage medium storing programming for execution by the processor. The programming includes instructions to determine, at a server, whether graphics data transmitted from the VM to a remote user device has reached a threshold bandwidth, upon determining that the graphics data has reached the threshold bandwidth, detect whether there is video data among the graphics data, and upon detecting video data among the graphics data, compress video data at a higher compression rate than the graphics data before transmitting the video data with the graphics data to the remote user device.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
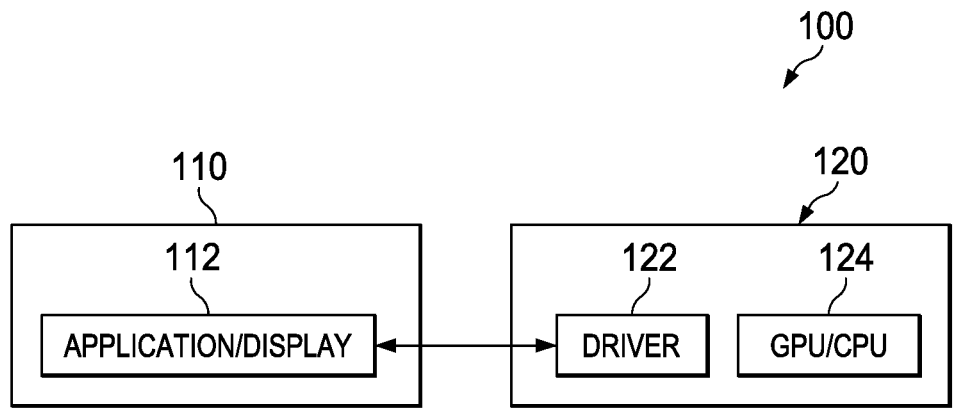
FIG. 1 illustrates an embodiment system for remote video detection and bandwidth management.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided for adaptive bandwidth management for transporting rendered graphics in a VDI. The embodiments include a video detection algorithm or scheme that enables a driver for a graphics processor at the server's end to identify displayed video data at the user's end. Typically, the driver can detect video data when sent to a video player (on the device) but is unable to distinguish video data from other graphics data that is sent to a browser application on the device. The detection algorithm enables the driver to identify video traffic that is sent to the user device by tracking repeated bitmap blits at the same display area or block (e.g., of a browser window) at the user device. A bitmap blit is used herein to refer to a computer graphics operation in which several bitmaps are combined into one using a raster operator. The amount of bitmap blits per display area or block can be monitored during a session, for example via hashing. When the number of bitmap blits (e.g., at a hash table entry) reaches a threshold, then the corresponding area is considered a video display area. The tracked number of bitmap blits per area (e.g., at the hash table entry) can be deleted after a pre-determined period of inactivity to limit the tracking to more recent display events.

Further, when shortage in bandwidth is determined, e.g., by detecting that a bandwidth threshold is reached, data corresponding to the detected video area and sent from the server to the device is compressed. The data can be compressed using a higher compression rate, e.g., beyond a standard or initial file compression format of the data, to reduce the amount of transferred video data (increase loss rate from compression). The higher compression rate has a higher data loss rate than the lower or standard compression rate that may be used to compress the data. For example, the data (including video data) may be initially compressed using JPEG format at a relatively lower compression rate to maintain image quality relatively high. To increase the compression rate of video data, the JPEG format compression rate is increased at the expense of image quality. Reducing the amount of video data reduces pressure on available bandwidth and allows faster video display on the device at the expense of video quality (due to higher compression rate). This improves user experience, since users can tolerate video quality to maintain display at an acceptable rate or speed. This remote video detection and bandwidth management scheme can also be used for bandwidth management of any similar graphics based traffic, where user experience (e.g., display speed) may be affected by bandwidth.

FIG. 1 shows an embodiment system 100 for remote video detection and bandwidth management. The system 100 comprises a user device 110 and a VM 120 at a remote server, e.g., at a data center. The user device 110 may be a smartphone, a computer laptop/tablet/desktop, or any other communication device that displays graphics and video. In the VDI, the user device 110 communicates with the VM 120 via TCP. As such, the user device 110 can display graphics that are rendered (e.g., processed for display formats) by the VM 120 remotely. The user device 110 comprises an application 112 configured to display the rendered graphics from the VM 120. The application 112 is any software such as a web browser or similar application that uses TCP or any other suitable protocol in the VDI to receive and display the graphics in a window (e.g., browser window) on the user device 110. The VM 120 comprises a driver 122 and a graphics processing unit (GPU) and/or central processing unit (CPU) 124. The GPU/CPU 124 is configured to render graphics data (including video data) for display. Other embodiments can use other types of processor(s) or hardware for this purpose. The driver 122 is any software/firmware configured to communicate with the application 112 and the GPU/CPU 124 to handle requests for graphics from the application 112 to the GPU/CPU 124 and send rendered graphics data (including video data) from the GPU/CPU 112 to the application 112.

Specifically, the driver 122 is configured, upon detecting insufficient or limited link bandwidth to the user device 110 or the application 112, to implement or trigger a relatively high compression rate of the video data sent to the user device 110. The data can be compressed at the driver 122 or a compression block (not shown) at the VM 120 or the server. Insufficient bandwidth can be determined when the amount of sent graphics data exceeds or is close to a pre-determined maximum threshold bandwidth. The higher compression rate is applied to video data that is detected by the VM 120, e.g., at the driver 122 or other detection block. The higher compression rate reduces the bandwidth of sent data, e.g., at the expense of displayed video quality at the application 112 (e.g., web browser). Other sent graphics data may be compressed at a lower or standard compression rate. Additionally, when the VM 120 detects a decrease in bandwidth of sent data, e.g., below a pre-determined threshold, the VM 120 stops the higher compression rate of the video data. The video data can still be compressed, e.g., regardless of bandwidth level, using relatively low or standard rate compression formats.

To detect whether the graphics data that is displayed by the application 112 belongs to video graphics or other graphics (e.g., pictures or images), the VM 120 or driver 122 is configured to keep track of area hits with blits from the application, e.g., track the number of blits per area blocks in a browser window. For instance, a hash table can be used to track the area hits with blits. When a blit is detected, a hash entry is updated to reflect the area hit with the detected blit. When the hits at the hash table entry reaches a pre-determined threshold number of times, the t area is considered a video display area in the application or browser window. Since the graphics in a video typically change at a faster rate than other graphics (e.g., still images), a suitable threshold number of times can be determined to distinguish the video graphics. Further, the number of hits in the table entries (corresponding to window areas or blocks) is reinitiated (e.g., reset to zero) after a certain time (e.g., a pre-determined wait time) when there is no change in the number of hits. As such, window areas that stop displaying video after some time can be accounted for.

Figure 2:
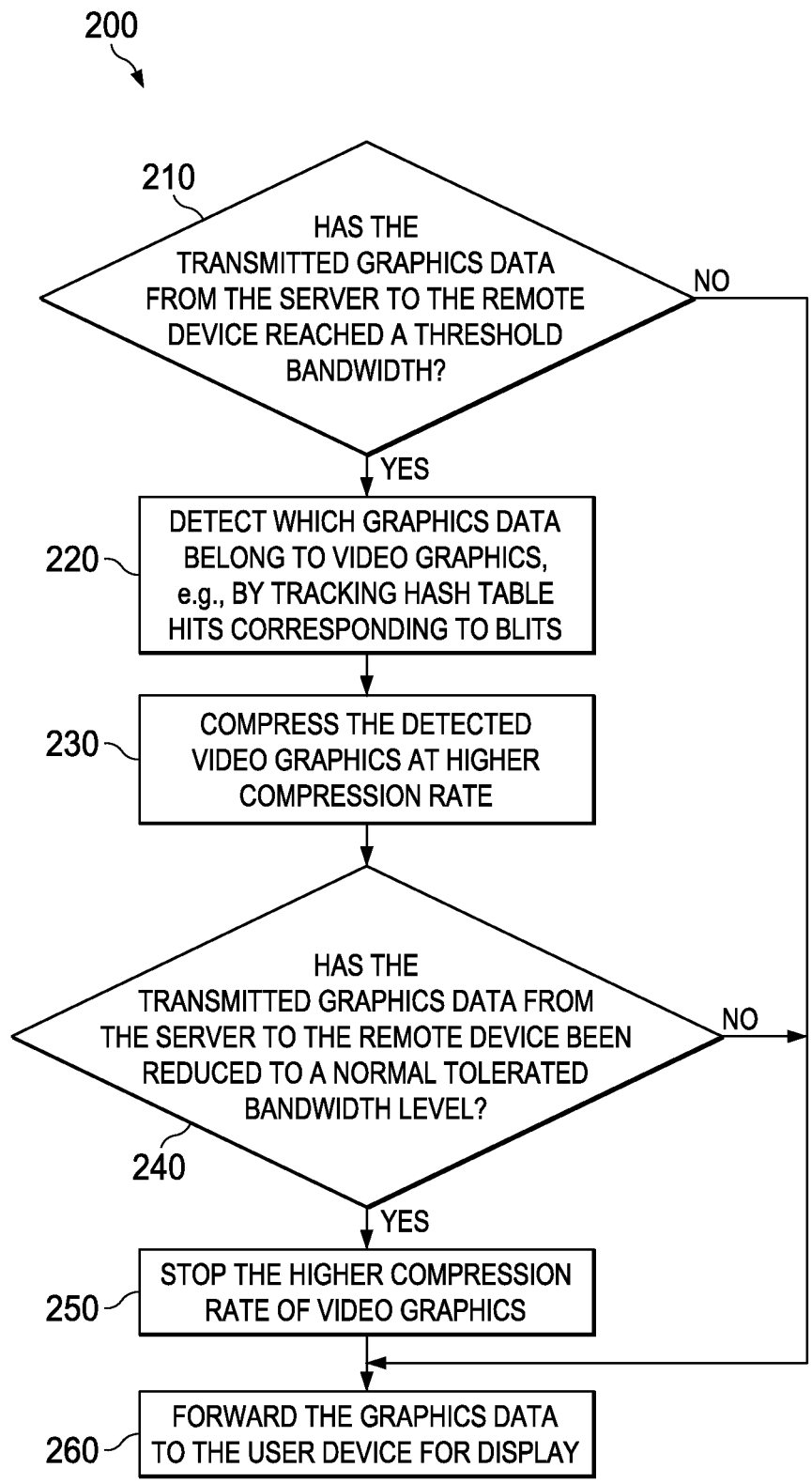
FIG. 2 illustrates an embodiment method for remote video detection and bandwidth management.

FIG. 2 shows an embodiment method 200 for remote video detection and bandwidth management. The method 200 can be implemented by one or more software/hardware components at a server or VM, such as the VM 120 or driver 122, that render graphics for a remote user device in a VDI. At step 210, the method 200 determines whether the transmitted graphics data from the VM or server to the remote device reaches a threshold bandwidth. If this condition is true, then the method 200 proceeds to step 220. Otherwise, the method 200 proceeds to step 260. At step 220, the method 200 detects which graphics data belong to video graphics, e.g., by tracking hash table hits corresponding to blits. At step 230, the detected video graphics are compressed at higher compression rate. At step 240, the method 200 determines whether the transmitted graphics data from the VM or server to the remote device are reduced to a normal tolerated bandwidth level. If this condition is true, then the method 200 proceeds to step 250. Otherwise, the method 200 proceeds to step 260. At step 250, the method 200 stops the higher compression rate of video graphics. At step 260, the graphics data is forwarded to the user device for display.

Figure 3:
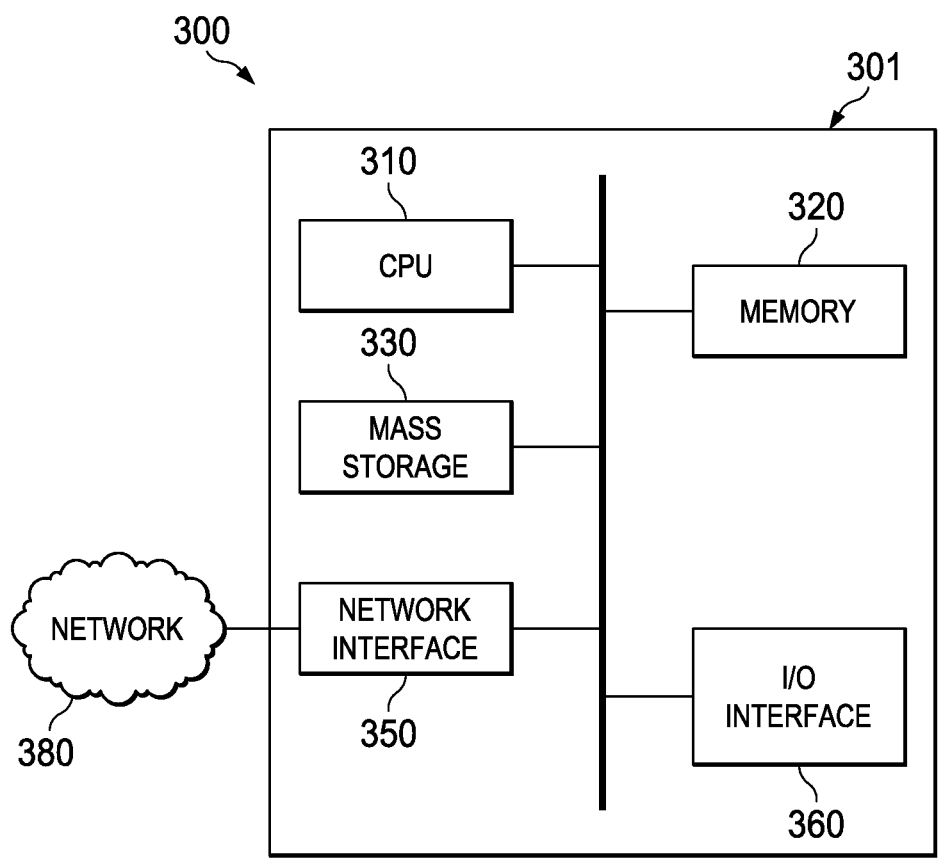
FIG. 3 is a processing system that can be used to implement various embodiments.

FIG. 3 is a block diagram of a processing system 300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adaptive bandwidth management to handle graphics for a virtual desktop infrastructure (VDI), the method comprising:
   determining, at a server, that graphics data transmitted to a remote user device has reached a threshold bandwidth;
   upon determining that the graphics data has reached the threshold bandwidth, detecting video data among the graphics data by using a table to track a number of bitmap blits at window display areas of an application, wherein a bitmap blit is a computer graphics operation in which multiple bitmaps are combined into one bitmap using a raster operator, and wherein the graphics data includes at least some non-video graphics data, wherein detecting the video data by using the table to track the number of bitmap blits comprises recording, in the table, a number of bitmap blits detected in a given window display area during a period, and determining that video data is present in the window display area during the period when the number of bitmap blits recorded in the table exceeds a threshold; and
   upon detecting the video data among the graphics data, compressing the video data at a higher compression rate than the non-video graphics data before transmitting the video data with the non-video graphics data to the remote user device.

2. The method of claim 1 further comprising:
   determining that the transmitted the graphics data has reached a tolerated bandwidth level; and
   upon determining that the transmitted graphics data has reached the tolerated bandwidth level, cease compressing the video data at the higher compression rate such that the video data and the non-video graphics data is compressed at the same compression rate.

3. The method of claim 1 further comprising:
   determining that the transmitted video data has reached a tolerated bandwidth level; and
   upon determining that the transmitted video data has reached the tolerated bandwidth level, cease compressing the video data at the higher compression rate such that the video data and the non-video graphics data is compressed at the same compression rate.

4. The method of claim 1, wherein the application is a web browser application that displays the graphics data on the remote user device.

5. The method of claim 4, wherein detecting video data among the graphics data further comprises:
   determining that a window display area is a video display area when the number of bitmap blits for the window display area has reached a pre-determined number.

6. The method of claim 1, wherein the video data is compressed at a higher compression rate than a standard or initial compression rate of the video data and the non-video graphics data used prior to determining that the graphics data has reached the threshold bandwidth.

7. The method of claim 1, wherein the video data is detected at a driver for graphics data processing at a virtual machine (VM) on the server.

8. A method for adaptive bandwidth management to handle graphics for a virtual desktop infrastructure (VDI), the method comprising:
   tracking, at a driver for graphics rendering at a virtual machine (VM), a number of bitmap blits for window display areas of an application that displays graphics data on a remote user device, wherein a bitmap blit is a computer graphics operation in which multiple bitmaps are combined into one bitmap using a raster operator, and wherein the graphics data includes at least some non-video graphics data, wherein tracking the number of bitmap blits comprises recording, in a table, a number of bitmap blits detected in a given window display area during a period, and determining that video data is present in the window display area during the period when the number of bitmap blits recorded in the table has reached a pre-determine number;
   upon detecting that the number of bitmap blits of a window display area has reached the pre-determined number, identifying the graphics data for the window display area as video data;
   tracking a bandwidth of the graphics data;
   upon detecting that the bandwidth has reached a threshold, increasing a compressing rate of the video data to a pre-determined rate; and
   sending the graphics data including the video data compressed at the pre-determined rate to the remote user device.

9. The method of claim 8, wherein the bandwidth of the video data is tracked after identifying the video data, and wherein the compression rate of the video data is increased when the bandwidth of the video data has reached the threshold.

10. The method of claim 8, wherein the bandwidth of the graphics data including the video data is tracked, and wherein the compression rate of the video data is increased when the bandwidth of the graphics data including the video data has reached the threshold.

11. The method of claim 8 further comprising hashing the number of bitmap blits for each window display area of the application on the remote user device to a table entry at the VM.

12. The method of claim 11 further comprising resetting the number of bitmap blits to zero in the table entry for a corresponding window display area when there is no change in the number of bitmap blits over a pre-determined period of time.

13. The method of claim 12 further comprising:
   identifying the graphics data for the corresponding window display area as non-video data; and resuming compression of the graphics data at a lower or standard compression rate for the corresponding window display area.

14. The method of claim 8, wherein the graphics data includes video data that is initially compressed before the bandwidth reaches the threshold at a compression rate substantially less than the pre-determined rate that is used to compress the video data after the bandwidth reaches the threshold.

15. A network component configured for adaptive bandwidth management for graphics rendering, the network component comprising:
a virtual machine (VM);
a processor; and
a computer readable storage medium storing programming for execution by the processor, the programming including instructions to:
determine that graphics data transmitted from the VM to a remote user device has reached a threshold bandwidth;
upon determining that the graphics data has reached the threshold bandwidth, detect video data among the graphics data by using a table to track a number of bitmap blits for window display areas of an application, wherein a bitmap blit is a computer graphics operation in which multiple bitmaps are combined into one bitmap using a raster operator, and wherein the graphics data includes at least some non-video graphics data, wherein the instructions to detect the video data by using the table to track the number of bitmap blits includes instructions to record, in the table, a number of bitmap blits detected in a given window display area during a period, and to determine that video data is present in the window display area during the period when the number of bitmap blits recorded in the table exceeds a threshold; and
upon detecting the video data among the graphics data, compress the video data at a higher compression rate than the non-video graphics data before transmitting the video data with the non-video graphics data to the remote user device.

16. The network component of claim 15, wherein the VM comprises:
a graphics processing unit (GPU) configured for rendering the graphics data including the video data; and
a driver configured to serve as an interface between the GPU and the application, and wherein the application displays the graphics data including the video data in a window on the remote user device.

17. The network component of claim 15, wherein the programming includes further instructions to:
determine whether the transmitted graphics data or video data has reached a tolerated bandwidth level; and
upon determining that the transmitted graphics data or video data has reached the tolerated bandwidth level, stop the higher compression rate of the video data.

18. The network component of claim 15, wherein the instructions to detect the video data further includes instructions to:
determine that a window display area is a video display area when the number of bitmap blits for the same window display area has reached a pre-determined number.

* * * * *